(12) United States Patent
Sergeeva et al.

(10) Patent No.: US 11,030,601 B1
(45) Date of Patent: Jun. 8, 2021

(54) VENDING MACHINE WITH RFID ANTENNAS

(71) Applicant: MHG IP Holdings, LLC, Bloomfield Hills, MI (US)

(72) Inventors: Nina P Sergeeva, St. Petersburg (RU); Kirill Sizyumov, Reutov (RU); Ruslan Ruziev, Moscow (RU); Nikita Makarov, Moscow (RU); Ivan Gurkin, Vidnoye (RU)

(73) Assignee: MHG IP Holdings, LLC, Bloomfield Hills, MI (US)

( * ) Notice: Subject to any disclaimer, the term of this patent is extended or adjusted under 35 U.S.C. 154(b) by 0 days.

(21) Appl. No.: 17/039,528

(22) Filed: Sep. 30, 2020

(51) Int. Cl.
| | | |
|---|---|---|
| *G06Q 20/20* | (2012.01) | |
| *G06Q 20/18* | (2012.01) | |
| *G06Q 20/02* | (2012.01) | |
| *G06K 7/10* | (2006.01) | |
| *G06Q 10/04* | (2012.01) | |
| *G06Q 30/06* | (2012.01) | |
| *G06K 19/07* | (2006.01) | |
| *H04L 29/06* | (2006.01) | |
| *G05B 19/042* | (2006.01) | |
| *G06Q 10/08* | (2012.01) | |

(52) U.S. Cl.
CPC ......... *G06Q 20/203* (2013.01); *G05B 19/042* (2013.01); *G06K 7/10297* (2013.01); *G06K 7/10415* (2013.01); *G06K 19/0723* (2013.01); *G06Q 10/04* (2013.01); *G06Q 10/087* (2013.01); *G06Q 20/02* (2013.01); *G06Q 20/18* (2013.01); *G06Q 30/0623* (2013.01); *H04L 63/08* (2013.01); *G05B 2219/2645* (2013.01); *G06K 2007/10504* (2013.01)

(58) Field of Classification Search
CPC .... G06Q 20/203; G06Q 10/087; G06Q 20/18; G06Q 30/0623; G06Q 20/02; G06Q 10/04; G06K 7/10297; G06K 19/0723; G06K 7/10415; G06K 2007/10504; G05B 19/042; G05B 2219/2645; H04L 63/08
USPC ............................................................ 705/22
See application file for complete search history.

(56) References Cited

U.S. PATENT DOCUMENTS

| | | | |
|---|---|---|---|
| 8,938,396 B2* | 1/2015 | Swafford, Jr. | A47F 1/126 705/22 |
| 2019/0147709 A1* | 5/2019 | Schoner | G06Q 20/322 235/383 |
| 2020/0273011 A1* | 8/2020 | Winsor | G06Q 30/0255 |

* cited by examiner

Primary Examiner — Russell S Glass
(74) Attorney, Agent, or Firm — Inventa Capital PLC

(57) ABSTRACT

A vending machine system (the system) of the present invention includes a vending machine for selectively providing one or more items stored therein to a user, the vending machine includes a radio-frequency identification (RFID) antenna, a communication module, a memory, and a controller, wherein the controller is communicatively coupled by a data transfer bus with the memory, the communication module and the RFID antenna. The system includes a user computing device, an accounting server configured to perform inventory accounting for the one or more items in the vending machine. The system also includes a transaction server configured to facilitate a transaction between the accounting server and the user computing device.

20 Claims, 3 Drawing Sheets

VENDING MACHINE WITH RFID ANTENNAS

FIELD OF THE INVENTION

The present invention relates to a computer equipment for data transfer between various of computing devices, and more particularly, the present invention relates to a vending machine system providing one or more items stored therein to be purchased by a user.

BRIEF DESCRIPTION OF THE INVENTION

Currently, there are many computer systems for vending machines. One of the examples of such systems is a vending apparatus control system using the RFID technology. This solution envisages the vending machine, connected to the remote station, which delivers the marked container to the user from the storage area, where containers of the various sizes and forms with different products, such as medical products, are stored.

The control system is able to select a specific unlabeled container from other containers in the storage and move the selected unlabeled container to the labelling module, where the label is applied after the position of the label and/or the selected unlabeled container is set in such manner that the label is applied in the desired position and angular orientation in relation to the selected unlabeled container. The control system of the vending machine can also move the labeled container to a delivery zone available to the user.

However, the known prior art solution has some drawbacks. The drawbacks of the known solution include the low accuracy of registration of the product withdrawal from the internal space of the vending machine.

The present invention aims to solve this problem by simple and convenient means and to eliminate the above-mentioned drawbacks.

SUMMARY OF THE INVENTION

In one aspect of the present invention, a vending machine system (the system) includes a vending machine for selectively providing one or more items stored therein to a user, the vending machine includes a radio-frequency identification (RFID) antenna, a communication module, a memory, and a controller, wherein the controller is communicatively coupled by a data transfer bus with the memory, the communication module and the RFID antenna. The system includes a user computing device, an accounting server configured to perform inventory accounting for the one or more items in the vending machine.

The system also includes a transaction server configured to facilitate a transaction between the accounting server and the user computing device, and a data transfer network, wherein the accounting and transaction servers, the vending machine and the user computing device are communicatively interconnected with one another by the data transfer network.

In another aspect of the present invention, a vending machine system (the system) includes a vending machine for selectively providing one or more items stored therein to a user. The vending machine includes a radio-frequency identification (RFID) antenna, a communication module, a memory, and a controller, wherein the controller is communicatively coupled by a data transfer bus with the memory. The communication module and the RFID antenna, wherein each of the one or more items stored in the vending machine comprises a passive RFID tag attached thereto. The RFID antenna of the vending machine is configured to determine presence or absence of the passive RFID tag of each of the one or more items. The system includes a user computing device comprising an authorization module configured to provide an authorization or authentication of the user, an accounting server configured to perform inventory accounting for the one or more items in the vending machine, the accounting server comprising an artificial intelligence (AI) module configured to conduct an automated inventory analysis of the vending machine, wherein the accounting server is communicatively coupled with a display for displaying the inventory analysis.

Alluding to the above, the system includes a transaction server configured to facilitate a transaction between the accounting server and the user computing device, wherein the transaction server is configured, in response to transaction data received via accounting server from the vending machine, to conduct the transaction between the user computing device and the accounting server based on the transaction data. The system includes a data transfer network, wherein the accounting and transaction servers, the vending machine and the user computing device are communicatively interconnected with one another by the data transfer network.

The technical result in this case is the improved accuracy of registration of the product withdrawal from the internal space of the vending machine using the RFID antennas and passive RFID tags in a vending machine. To reach this technical result the vending machine is offered, which provides the possibility to establish a two-way communication with the remote server, reading data from the RFID antennas and providing products to the users.

An advantage of the present invention is to provide an improved system that includes the controller providing the possibility to read data from the RFID antennas and containing connectors for vending machine lighting modules, vending machine locks, vending machine temperature and humidity gauges, and a power socket to supply power from an uninterruptible power supply and power supply network, where the mentioned connectors are used to control the lighting and the locks of the vending machine.

Another advantage of the present invention is to provide the system configured to control the lighting and the temperature and humidity inside the vending machine, and at the same time the data is read from the RFID antennas when the vending machine door closes; memory, connected to the controller, providing the possibility to save the data read from the RFID antennas and received from the data accounting server; communication device.

Still another advantage of the present invention is to provide the system configured to transfer data read from the RFID antennas, to the remote server and reception of the data processed by the mentioned server, the RFID antennas, providing the possibility to determine the presence or absence of passive RFID tags of each product placed in a remote vending machine, and ensuring data transfer to and from the controller and the remote server using the communication device.

Still another advantage of the present invention is to provide the system configured to have the data present information about the product to be moved from the internal space of the vending machine after the vending machine door was closed, wherein, at the same time, each RFID antenna consists of two short-circuited emitters with feed points, connected between themselves with the divider using cables with low signal attenuation, where the divider is connected to the vending machine controller via a SMA socket; and each RFID antenna provides the electromagnetic intensity in the near range, where the mentioned intensity results in the possibility to detect the presence or absence of passive RFID tags near each RFID antenna, where each passive RFID tag is attached to each product.

Still another advantage of the present invention is to provide the vending machine including the display, controlled by the controller and providing the possibility of video content output, wherein the data transfer network is a TCP/IP network and/or WiFi network and the controller contains a discrete SIM-card used to connect to the data transfer network, which is a part of the mobile Internet network.

The objects and advantages of the present invention will be more readily apparent from inspection of the following specification, taken in connection with the accompanying drawing, wherein like numerals refer to like parts throughout and in which an embodiment of the present invention is described and illustrated.

The exact manner in which the foregoing and other objects and advantages of the invention are achieved in practice will become more clearly apparent when reference is made to the following detailed description of the preferred embodiments of the invention described in detail in the following specification and shown in the accompanying drawings, where in like reference numbers indicate corresponding parts throughout.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
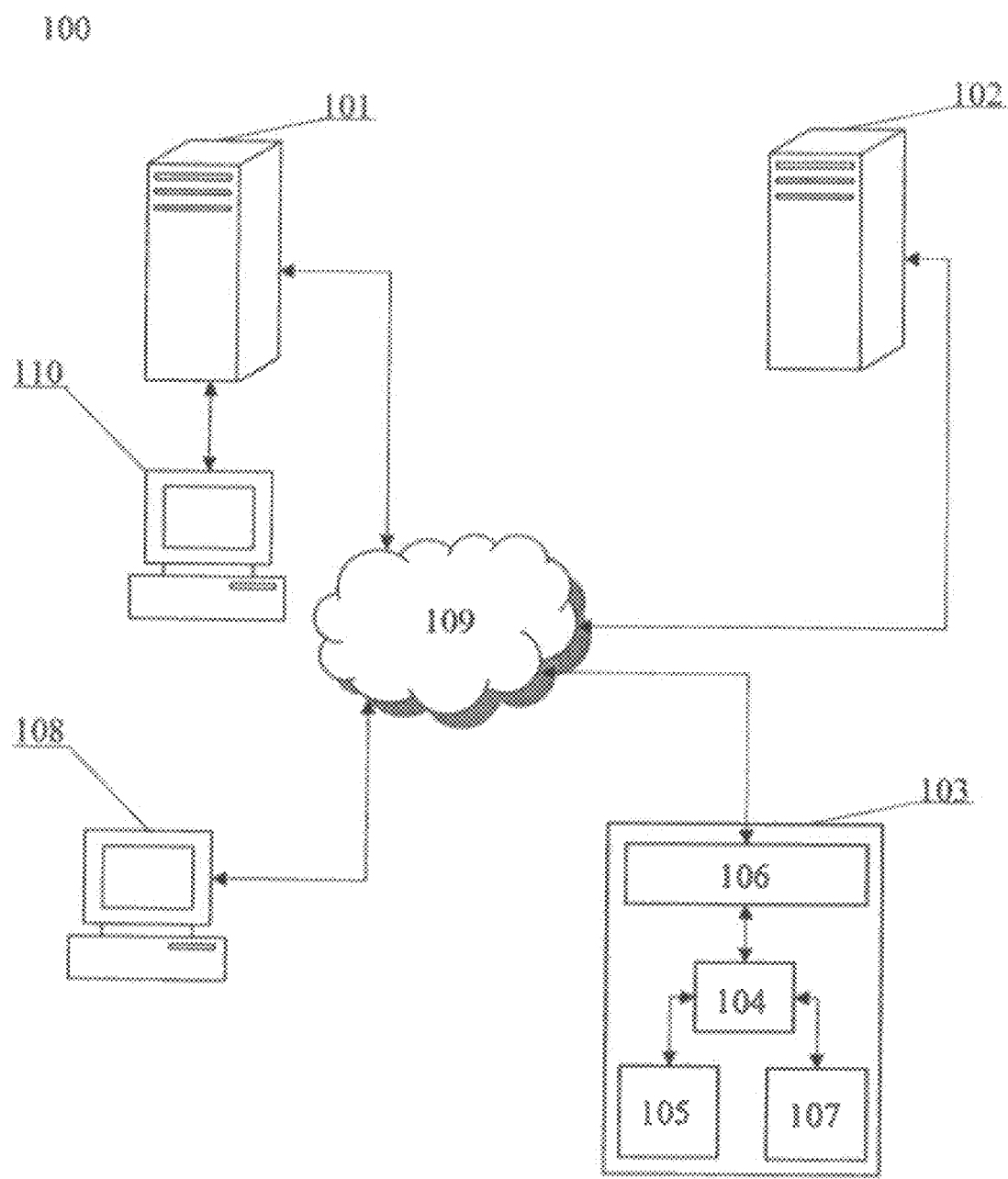
FIG. 1 is a schematic illustration of a data transfer system between a server, a remote vending machine and a user's computing device.
Figure 2:
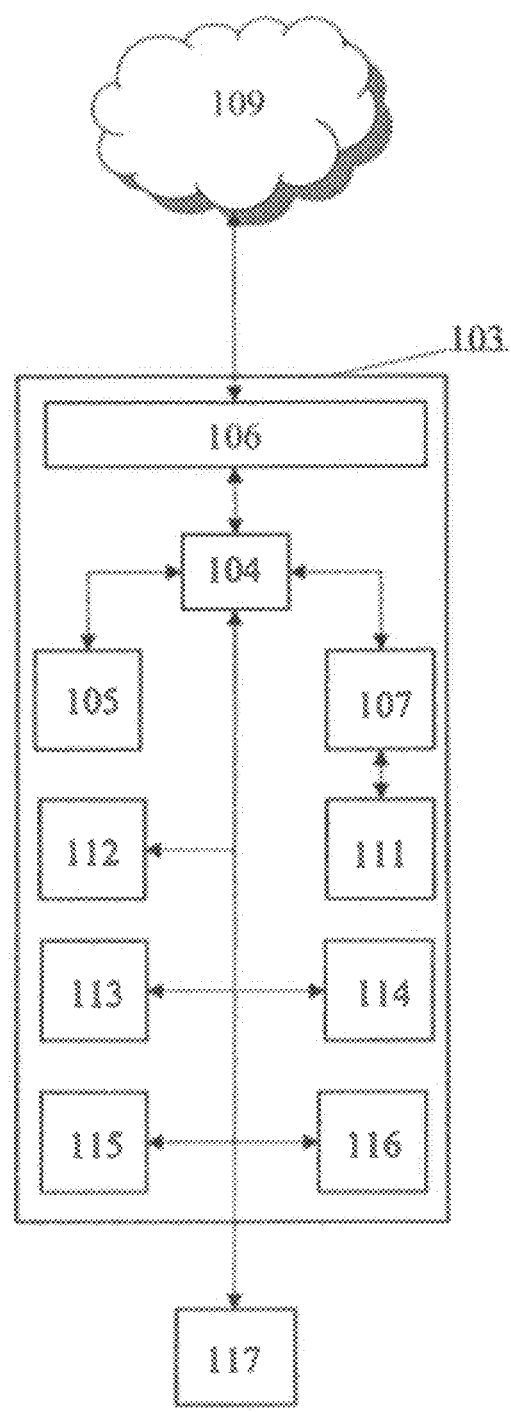
FIG. 2 is a schematic illustration of the vending machine configured to establish a two-way communication with a remote server, reading data from RFID antennas and providing product to the users.
Figure 3:
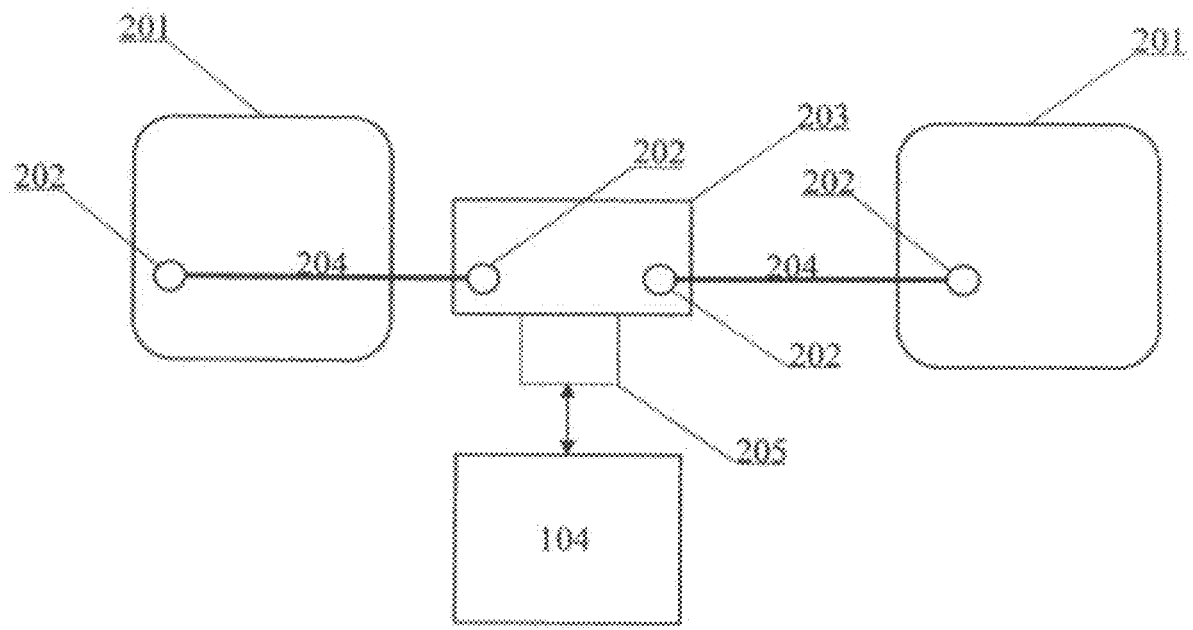
FIG. 3 is a schematic illustration of an RFID vending machine RFID antenna.

Referring to the FIGS. 1 through 3, a vending machine system (the system) is generally shown at 100 in FIG. 1. Because explicit identification of object-oriented constructs expressed through the syntax of high-level object-oriented programming languages is lost during compilation to binary code (e.g., translation of a source code definition or representation of an application to a binary code definition or representation of the application such as a machine code or byte-code definition), potential security vulnerabilities can be obscured during static analysis of the resulting binary code.

For example, because information about an object (e.g., the class on which the object is based, the size of the object, the number and types or sizes of properties of the object, and the number of functionalities accessible to the object via a dispatch table) is typically not expressed in binary code, determining whether indirect operations relative to the object expose security vulnerabilities can be difficult without the source code from which the binary code was generated.

As a specific example, an indirect operation can result in arbitrary code execution security vulnerabilities if the binary code does not include run-time validation to ensure that the indirect operation does not operate outside or beyond the object (i.e., at memory addresses not allocated to or shared by the object). Some binary code representations of applications, however, do include information about objects. Such information can be included in binary code as run-time type information (RTTI) or debugging information that is compiled into the binary code. Nevertheless, because the binary code representations of many applications do not include such information (e.g., to discourage reverse engineering of these applications), robust methodologies and systems for analyzing binary code based on (or derived from) source code using object-oriented techniques should not assume availability of such information.

Implementations discussed herein analyze operations described in binary code to identify objects based on those operations. Said differently, implementations discussed herein reconstruct, at least partially, objects (or representations of objects) by inferring the structure of such objects based on operations described in binary code. Thus, implementations discussed herein can identify objects and attributes such as a size thereof without referring to (or independent of) source code or explicit information about such objects which may or may not be included in the binary code.

Furthermore, implementations discussed herein perform security vulnerability analyses of binary code representations of applications using such objects. For example, implementations discussed herein can identify security vulnerabilities such as type confusion vulnerabilities that can result in arbitrary code execution, code injection, application failure, or other undesirable or unintended behavior of an application using information about objects identified by analysis of operations described in binary code.

Accordingly, implementations discussed herein with reference to analysis of operations described in binary code should be understood to refer to analysis of those operations using a binary code representation of a software module or a representation of the software module derived from the binary code representation.

A variable within a memory is a memory location at which one or more values can be stored. Such a memory location can be at a processor memory (e.g., a register or cache), at a system memory (e.g., a Random Access Memory (RAM) of a computing system), or at some other memory. Operations within binary code that operate on such variables can refer to a memory address (either absolute or relative to another memory address such as an offset from a stack pointer) of that memory location. Thus, the identifier (e.g., memory address) of an object can be stored as a value at a memory location with a memory address that is used by operations within the binary code.

Accordingly, as used herein, terms such as "identifier of an object" and "memory address of an object" should be understood to refer to the identifier (e.g., memory address) itself or to a variable at which a value representing the identifier is stored. As used herein, the term "module" refers to a combination of hardware (e.g., a processor such as an integrated circuit or other circuitry) and software (e.g., machine- or processor-executable instructions, commands, or code such as firmware, programming, or object code).

A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Furthermore, as used herein, the term "based on" includes based at least in part on. Thus, a feature that is described as based on some cause, can be based only on that cause, or based on that cause and on one or more other causes.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Referring to FIG. 1, the system 100 for the data transfer between a server, a remote vending machine and a user's computing device. The system 100 consists of an accounting or inventory accounting server 101, a remote transaction server 102, a remote vending machine 103 and a user's computing device 108, where the server 101, the remote server 102, the remote vending machine 103 and the user's computing device 108 are communicatively connected between each other using data transfer network 109. The data transfer network 109 is one of the following networks: Internet, Wi-Fi, GPRS, 3G, 4G, 5G, WiMax, LTE or LTE-A based network, TCP/IP network. The inventory accounting and transactions server 101 is communicatively connected to the operator's screen or display 110 and provides the possibility of communication using the data transfer network 109 with at least one remote transaction server 102, at least one remote vending machine 103, and at least one user's computing device 108. The inventory accounting server 101 contains an AI unit for automatic analysis of data relating to inventory for further display on the operator's screen 110. The data inventory analysis includes a forecast of future inventories in the remote vending machine 103, taking into account the data received from the remote vending machine 103. The accounting server 101 gallows to make transactions with the remote transaction server 102 in response to the data; received from at least one remote vending machine 103 after a door of the at least one vending machine 103 was closed.

Alluding to the above, the AI unit sends to the operator's display 110 information about expiration date(s) of the product, placed or stored in the vending machine 103. The remote transaction server 102 provides the possibility to ensure transaction between the user's computing device 108 and the accounting server 101. The remote server 102 is configured to operate as follows: in response to data received by the server 101 from the remote vending machine 103, the server 101 transmits the data on the transaction to the server 102. The server 102, in response to the received data, makes a transaction between the user's computing device 108 and the accounting server 101 in accordance with the received data. The remote vending machine 103 provides the possibility of communication, by using the data transfer network 109 and a communication device 106 included in the vending machine 103, with the accounting server 101. The vending machine 103 also provides the possibility of giving product to the user. The remote vending machine 103 includes a controller 104, a memory 105, the communication device 106 and a RFID antenna 107. The controller 104 is connected using the data transfer bus with the memory 105, the communication device 106 and the RFID antenna 107. A more detailed description of the remote vending machine 103 construction will be given with reference to FIG. 2 to be described below.

The vending machine 103 is connected to the user's computing device 108 via the communication device 106. The user's computing device 108 provides the possibility for the transfer and receipt of data with the accounting server 101, at the same time the user's computing device 108 contains an authorization module, which provides the possibility of user authorization. In case of the failed authorization the user authorization module displays an error on the computing device 108 screen. In case of successful authorization it performs the following: transfer of commands to the vending machine 103 and the controller 104 using the data transfer network 109 and the accounting server 101, where the commands initiate the controller 104 to open the lock 113 of the vending machine door, reception of data from the vending machine 103 and the controller 104 via the data transfer network 109 and the accounting server 101 after the vending machine 103 door closes, and provides for the transaction to be made between the accounting server 101 and the remote transaction server 102 according to the data, received from the vending machine 103 and the controller 104.

The user's computing device 108 can be at least one of the following: tablet, smartphone, laptop, PC, and any other computing device, containing at least one processor and memory. Besides, the authorization module can provide the possibility to display on the user's computing device 108 screen the information about the composition of the product, its price and information about the fiscal receipt according to the product, the RFID antenna 107 of which was triggered when the product was taken from the vending machine 103.

Referring to FIG. 2, the vending machine 103 is described. The controller 104 provides the possibility to read the data from RFID antennas 107 and includes connection sockets, using the data transfer bus, for the lighting modules 112 of the vending machine, locks 113 of the vending machine, temperature 114 and humidity 115 gauges of the vending machine, and power sockets for power supply from an uninterruptible power supply 116 and power supply network 117. The above sockets are used to provide control of lighting and locks of the vending machine 103, temperature and humidity inside the vending machine 103. Besides, the controller 104 can contain a discrete SIM-card used to connect to the data transfer network, which is a part of the mobile Internet network.

Alluding to the above, the lighting modules 112 of the vending machine 103 illuminate the internal space of the vending machine 103, and also, if necessary, the external space near the vending machine 103. The locks 113 of the vending machine lock and unlock the door of the vending machine 103. At the same time the mentioned locking or unlocking are carried out in response to control signals from the controller 104. The temperature 114 and humidity 115 gauges ensure detection of the current temperature and humidity of the internal space.

The controller 104 registers the data received from the above gauges and, in case of deviation of humidity or temperature from the set limits, uses the internal devices to regulate the humidity and the temperature in its internal space. The vending device 103 also contains the uninterruptible power supply 116, connected to the corresponding input of the controller 104. The controller 104 is powered using the power supply network 117. However, in case of power interruption the network 117 automatically switches to the uninterruptible power supply 116. The vending machine can additionally include a display, controlled by the controller 104. The display provides the possibility to output video content.

Referring to FIG. 3, a structure of the RFID antennas 107 and the operation of RFID antennas 107 and the passive RFID tags 111 is described. The passive RFID tags 111 are attached to each separate product, located inside the vending machine 103. The RFID antennas 107 determine the presence or absence of the passive RFID tags 111 of each product, placed in the remote vending machine 103. The RFID antennas 107 also ensure reception and transfer of data to the controller 104 and the remote server 101 using the communication device 106. These data provide information about the product moved from the interior of the vending machine 103 after closing the door of the vending machine 103. Each RFID antenna 107 consists of two short-circuited emitters 201, connected between themselves with a divider 203 using cables 204 with low signal attenuation and feed points 202. The divider 203 is connected to the controller 104 of the vending machine 103 via a SMA socket 205.

Each RFID antenna 107 provides the electromagnetic intensity in the near range, where the mentioned intensity results in the possibility to detect the presence or absence of the passive RFID tags 111 near each RFID antenna 107. It should be noted that in this case, any other external device controller can be used as the controller 104 of the vending machine 103. PC, laptop, server, etc. can be used as an external device. The SMA socket 205 transmits the high frequency (860-920 MHz) current to the antenna divider 203 and subsequently the divider 203 transmits the current to the emitters 201. The antenna divider 203 and the emitters are two copper layers with thickness 35 nm, separated by a dielectric. When the current is applied, the potential difference between the copper layers generates electromagnetic radiation. Two short-circuited emitters 201 modulate a stable electromagnetic intensity within near range up to 20 cm along the entire length of the antenna (490 mm) and a predetermined radiation direction pattern, taking into account the displacement caused by the surrounding metal walls of the vending machine 103. Diagram of direction ±30 cm from the center lengthwise and ±20 cm from the center widthwise 20 cm away from the front side of the antenna reaching the gain of the antenna −1.25 dbi at SWR <1.04 is only possible if the antenna is surrounded by metal walls at the distance of 20 to 60 cm.

Due to the pattern of the upper copper layer 201 of the emitter, the circular polarization is achieved, due to which the electromagnetic waves are radiated along the helical arc, which allows to use any RFID tags 111 located within the RFID antenna 107 range. Within the electromagnetic intensity field radiated by the RFID antenna 107, the passive RFID tags 111 start to modulate the high-frequency field in response. At this point the RFID antenna 107 switches to reading mode and transmits all vibrations of the electromagnetic radiation from the tags 111 to the SMA connector 205 via the high frequency cable to the controller 104. The RFID antenna 107 itself is fixed horizontally and parallel to the shelves of the vending machine 103, where the products with passive RFID tags 111 are placed.

The data is read from the RFID antennas 107 when the door of the vending machine 103 is closed. Below we provide an example of the implementation of the solution. The user performs authorization (authentication) using the user's computing device 108 and an authorization module. If the authorization is failed, the authorization module displays an error message on the display of the device 108, and an offer to repeat the authorization process. In case of successful authorization, the authentication module sends a command to the controller 104 of the vending machine 103 via the data transfer network 109 and the accounting server 101, where the commands initiate the controller 104 to open the lock 113 of the vending machine 103 door. After the door opens, the user has the right to choose and take any product placed on the vending machine 103 shelves. When the product is selected and taken from the shelves of the vending machine, the door of the vending machine 103 closes. The fact of door closing is the moment when the controller 104 starts polling the RFID antennas 107.

Each RFID antenna 107 scans the passive RFID tags 111. If the scan by the mentioned RFID antenna (s) 107 discovers the absence of any of the RFID tags 111, a corresponding signal is transmitted by the RFID antenna 107 to the controller 104. The controller 104 receives the signal containing the data of the RFID tag 111 which has not been identified by the RFID antenna 107 after closing the vending machine 103 door. The controller 104 compares these data with the data stored in the memory 105. If in the result of the above-mentioned comparison, it is determined that the data were detected and transmitted to the server 101 at the previous door opening, the controller 104 stops further data processing. If in the result of the above mentioned comparison, it is determined that the data were not detected and transmitted to the server 101 at the previous door opening, the controller 104 stores this information in the memory 105 for subsequent comparisons, and at the same time transmits the data to the accounting server 101. In accordance with data transmitted by the controller 104, the accounting server 101 saves this information in at least one database, which contains data on the inventory of the remote vending machine 103. At the same time the AI unit of the server 101 performs an automatic analysis of the data on the inventory for further output to the operator's display 110. After saving, the server 101 connects to the transaction server 102, and upon establishing the connection sends a request for the transaction in accordance with the data received from the controller 104 of the vending machine 103. After receiving the mentioned request, the transaction server 102 makes a transaction between the user's computing device 108 and the accounting server 101 in accordance with the received data.

Although this invention was shown and described with reference to some options in its implementation, the specialists in this sphere of technology will understand that various changes and modifications can be made in it, without leaving the actual scope of the invention.

In another aspect of the present invention the vending machine system (the system) 100 of the present invention is used to selectively providing one or more items stored therein to the user, the vending machine includes the radio-frequency identification (RFID) antenna 107, the communication module 106, the memory 105, and the controller, wherein the controller is communicatively coupled by the data transfer bus with the memory, the communication module 106 and the RFID antenna 107. The system 100 includes the user computing device 108, the accounting server 101 configured to perform inventory accounting for the one or more items in the vending machine.

The system 100 also includes the transaction server 102 configured to facilitate a transaction between the accounting server 101 and the user computing device 108, and a data transfer network, wherein the accounting and transaction servers 101, the vending machine and the user computing device 108 are communicatively interconnected with one another by the data transfer network. The accounting server 101 comprises an artificial intelligence (AI) module configured to conduct an automated inventory analysis of the vending machine, and wherein the accounting server 101 is communicatively coupled with a display for displaying the inventory analysis. The inventory analysis includes a forecast of future inventories required for the vending machine and an expiration date of the one or more items stored in the vending machine, and wherein the inventory analysis is based on data received from the vending machine. The accounting server 101 is configured to conduct a transaction with the transaction server 102 in response to transaction data received from the vending machine after one or more doors of the vending machine are locked. The transaction server 102 is configured, in response to transaction data received via the accounting server 101 from the vending machine, to conduct the transaction between the user computing device 108 and the accounting server 101 based on the transaction data.

The user computing device 108 comprises an authorization module configured to provide an authorization or authentication of the user, and wherein the user computing device 108 is configured to cause a transfer and receipt of data with the accounting server 101. In response to the user being authorized, the authorization module is configured to (a) transmit a command to the controller of the vending machine to initiate the controller to unlock the door of the vending machine, (b) receive data from the controller of the vending machine after the door of the vending machine is locked, and (c) initiate a transaction between the accounting server 101 and the transaction server 102 based on data received from the controller of the vending machine.

The authorization module is configured to prompt the screen of the user computing device 108 to display information about the one or more items provided by the vending machine. The vending machine further comprises the lighting module 112, one or more locking mechanisms 113, the temperature gauge 114 and the humidity gauge 115, and wherein the controller of the vending machine is communicatively connected with and configured to control the lighting module 112, the one or more locking mechanisms 113, the temperature gauge 114 and the humidity gauge 115. The lighting module 112 is configured to illuminate the internal chamber of the vending machine, wherein the one or more locking mechanisms 113 are configured to lock and unlock the door of the vending machine, and wherein the temperature 114 and humidity 115 gauges are configured to detect respective temperature and humidity of the internal chamber of the vending machine.

The vending machine further comprises a display 110 controlled by the controller of the vending machine, and wherein the display 110 is configured to output video content. Each of the one or more items stored in the vending machine comprises the passive RFID tag 111 attached thereto, and wherein the RFID antenna 107 of the vending machine is configured to determine presence or absence of the passive RFID tag 111 of each of the one or more items. The RFID antenna 107 is fixed horizontally and parallel to one or more shelves of the vending machine that support the one or more items with the passive RFID tag 111 attached thereto. The RFID antenna 107 is configured to communicate data related to the presence or absence of the one or more items in the vending machine to the controller, and wherein the controller is configured to transmit the data, via the communication module 106, to the accounting server 101.

The data related to the presence or absence of the one or more items in the vending machine is received by the controller from the RFID antenna 107 of the vending machine in response to a prompt sent by the controller when the door of the vending machine is locked. The RFID antenna 107 of the vending machine comprises the antenna divider 203, the pair of short-circuited emitters 201, the pair of cables 204 each connecting respective one of the short-circuited emitters 201 to the antenna divider 203, and the SMA connector 205 communicatively coupling the antenna divider 203 to the controller of the vending machine.

The memory of the vending machine is configured to record and store information about the one or more items stored in the vending machine, wherein the information is transmitted by the controller to the accounting server 101, and wherein the accounting server 101 stores the information in the database that contains inventory data of the vending machine.

The technical result in this case is the improved accuracy of registration of the product withdrawal from the internal space of the vending machine using the RFID antennas 107 and the passive RFID tags 111 in the vending machine. To reach this technical result the vending machine is offered, which provides the possibility to establish a two-way communication with the remote server 102, reading data from the RFID antennas 107 and providing products to the users. This machine includes the controller providing the possibility to read data from the RFID antennas 107 and containing the connectors for vending machine lighting modules, the vending machine locks 113, the vending machine temperature 114 and humidity 115 gauges, and the power socket to supply power from the uninterruptible power supply and power supply network, where the mentioned connectors are used to control the lighting and the locks 113 of the vending machine, temperature and humidity inside the vending machine, and at the same time the data is read from the RFID antennas 107 when the vending machine door closes; the memory 105, connected to the controller, to save the data read from the RFID antennas 107 and received from the data accounting server 101 and the communication device 106 to transfer data read from the RFID antennas 107, to the remote server 102 and reception of the data processed by the mentioned server; the RFID antennas 107 to determine the presence or absence of the passive RFID tags 111 of each product placed in the remote vending machine, and ensuring data transfer to and from the controller and the remote server 102 using the communication device 106, where the data present information about the product moved from the internal space of the vending machine after the vending machine door was closed, at the same time each RFID antenna 107 consists of two short-circuited emitters 201 with feed points, connected between themselves with a divider using cables with low signal attenuation.

Alluding to the above, the divider 203 is connected to the vending machine controller via the SMA socket 205 and each RFID antenna 107 provides the electromagnetic intensity in the near range, where the mentioned intensity results in the possibility to detect the presence or absence of the passive RFID tags 111 near each RFID antenna 107, where each passive RFID tag 111 is attached to each product.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:
1. A vending machine system comprising:
   a vending machine for selectively providing one or more items stored therein to a user, said vending machine comprising a communication module, a memory, and a controller, wherein said controller is communicatively connected with said memory and said communication module;
   a radio-frequency identification (RFID) antenna comprising (a) a pair of emitters, (b) an antenna divider disposed between said pair of emitters, (c) a pair of cables each connecting respective one of said pair of emitters to said antenna divider, and (d) a connector coupled to said antenna divider and connecting said antenna divider to said controller of said vending machine;
   a user computing device;
   an accounting server configured to perform inventory accounting for the one or more items in said vending machine;
   a transaction server configured to facilitate a transaction between said accounting server and said user computing device; and
   a data transfer network;
   wherein said accounting and transaction servers, said vending machine and said user computing device are communicatively interconnected with one another by said data transfer network.

2. The vending machine system of claim 1, wherein said accounting server comprises an artificial intelligence (AI) module configured to conduct an automated inventory analysis of said vending machine, and wherein said accounting server is communicatively coupled with a display for displaying the inventory analysis.

3. The vending machine system of claim 2, wherein the inventory analysis includes a forecast of future inventories required for said vending machine and an expiration date of the one or more items stored in said vending machine, and wherein the inventory analysis is based on data received from said vending machine.

4. The vending machine system of claim 1, wherein said accounting server is configured to conduct a transaction with said transaction server in response to transaction data received from said vending machine after one or more doors of said vending machine arc locked.

5. The vending machine system of claim 1, wherein said transaction server is configured, in response to transaction data received via accounting server from said vending machine, to conduct the transaction between said user computing device and said accounting server based on the transaction data.

6. The vending machine system of claim 1, wherein said user computing device comprises an authorization module configured to provide an authorization or authentication of the user, and wherein said user computing device is configured to cause a transfer and receipt of data with said accounting server.

7. The vending machine system of claim 6, wherein, in response to the user being authorized, said authorization module is configured to (a) transmit a command to said controller of said vending machine to initiate said controller to unlock a door of said vending machine, (b) receive data from said controller of said vending machine after said door of said vending machine is locked, and (c) initiate a transaction between said accounting server and said transaction server based on data received from said controller of said vending machine.

8. The vending machine system of claim 7, wherein said authorization module is configured to prompt a screen of said user computing device to display information about the one or more items provided by said vending machine.

9. The vending machine system of claim 1, wherein said vending machine further comprises a lighting module, one or more locking mechanisms, a temperature gauge and a humidity gauge, and wherein said controller of said vending machine is communicatively connected with and configured to control said lighting module, said one or more locking mechanisms, said temperature gauge and said humidity gauge.

10. The vending machine system of claim 9, wherein said lighting module is configured to illuminate an internal chamber of said vending machine, wherein said one or more locking mechanisms are configured to lock and unlock a door of said vending machine, and wherein said temperature and humidity gauges are configured to detect respective temperature and humidity of said internal chamber of said vending machine.

11. The vending machine system of claim 1, wherein said vending machine further comprises a display controlled by said controller of said vending machine, and wherein said display is configured to output video content.

12. The vending machine system of claim 1, wherein each of the one or more items stored in said vending machine comprises a passive RFID tag attached thereto, and wherein said RFID antenna of said vending machine is configured to determine presence or absence of said passive RFID mg of each of the one or more items.

13. The vending machine system of claim 12, wherein said RFID antenna is fixed horizontally and parallel to one or more shelves of said vending machine that support the one or more items with said passive RFID tag attached thereto.

14. The vending machine system of claim 12, wherein said RFID antenna is configured to communicate data related to the presence or absence of the one or more items in said vending machine to said controller, and wherein said controller is configured to transmit the data, via said communication module, to said accounting server.

15. The vending machine system of claim 14, wherein the data related to the presence or absence of the one or more items in said vending machine is received by said controller from said RFID antenna of said vending machine in response to a prompt sent by said controller when a door of said vending machine is locked.

16. The vending machine system of claim 1, wherein each of said pair of emitters comprises a short-circuited emitter, wherein each of said cables comprises a pair of low signal attenuation and feed points, and wherein said connector is an SMA connector.

17. The vending machine system of claim 1, wherein said memory of said vending machine is configured to record and store information about the one or more items stored in said vending machine, wherein the information is transmitted by said controller to said accounting server, and wherein said accounting server stores the information in a database that contains inventory data of said vending machine.

18. A vending machine system comprising:
   a vending machine for selectively providing one or more items stored therein to a user, said vending machine comprising a communication module, a memory, and a controller, wherein said controller is communicatively connected with said memory and said communication module, and wherein each of the one or more items stored in said vending machine comprises a passive RFID tag attached thereto;
   a radio-frequency identification (RFID) antenna comprising (a) a pair of short-circuited emitters, (b) an antenna divider disposed between said pair of short-circuited emitters, (c) a pair of cables each connecting respective one of said pair of short-circuited emitters to said antenna divider, and (d) a connector coupled to said antenna divider and connecting said antenna divider to said controller of said vending machine, wherein said RED antenna of said vending machine is configured to determine presence or absence of said passive RFID tag of each of the one or more items, and wherein said RED antenna is communicatively coupled with said controller;
   a user computing device comprising an authorization module configured to provide an authorization or authentication of the user;
   an accounting server configured to perform inventory accounting for the one or more items in said vending machine, said accounting server comprising an artificial intelligence (AI) module configured to conduct an automated inventory analysis of said vending machine, wherein said accounting server is communicatively coupled with a display for displaying the inventory analysis;
   a transaction server configured to facilitate a transaction between said accounting server and said user computing device, wherein said transaction server is configured, in response to transaction data received via accounting server from said vending machine, to conduct the transaction between said user computing device and said accounting server based on the transaction data; and
   a data transfer network, wherein said accounting and transaction servers, said vending machine and said user computing device are communicatively interconnected with one another by said data transfer network.

19. The vending machine system of claim 18, wherein said vending machine further comprises a lighting module, one or more locking mechanisms, a temperature gauge and a humidity gauge, and wherein said controller of said vending machine is communicatively connected with and configured to control said lighting module, said one or more locking mechanisms, said temperature gauge and said humidity gauge.

20. The vending machine system of claim 19, wherein each of said cables comprises a pair of low signal attenuation and feed points, and wherein said connector is an SMA connector.

* * * * *